United States Patent [19]

Tomlinson, II

[11] 4,312,702
[45] Jan. 26, 1982

[54] FLUIDIZED BED START UP AND OPERATION

[75] Inventor: George H. Tomlinson, II, Ile Perrot, Canada

[73] Assignee: Domtar Inc., Montreal, Canada

[21] Appl. No.: 147,058

[22] Filed: May 6, 1980

[51] Int. Cl.³ ............................................. D21C 11/12
[52] U.S. Cl. ................................ 162/30 R; 122/7 C; 162/30 K; 162/47; 423/207
[58] Field of Search ..................... 162/30 R, 30 K, 36, 162/47; 122/7 C, 4 D; 110/238, 245, 341, 342, 348; 423/207, DIG. 3; 432/58; 431/6

[56] References Cited

U.S. PATENT DOCUMENTS

| | | | |
|---|---|---|---|
| 3,309,262 | 3/1967 | Copeland et al. | 162/30 K |
| 3,657,064 | 4/1972 | Shick | 162/36 |
| 3,996,863 | 12/1976 | Osborn | 110/348 |
| 4,235,174 | 11/1980 | Spurrell | 110/245 |

*Primary Examiner*—Peter Chin

[57] ABSTRACT

At start-up, a bed of pellets derived from pulp mill residual liquor is fluidized by feeding preheated air to the bed to initially raise the temperature of the bed to a temperature at which a particulate ligno-cellulosic auxiliary solid fuel may be completely consumed (800°–850° F.) and less than the yield temperature of the heat exchanger, feeding the auxiliary fuel to the fluidized bed, so as to burn the auxiliary fuel within the bed, feeding coolant to the heat exchanger to protect the heat exchanger from thermally induced damage, coordinating the rate of feeding of coolant with the rate of injection of the solid fuel to further increase the temperature of the bed to at least a temperature at which concentrated residual liquor from said mill will be burned while maintaining the temperature of the heat exchange equipment below the yield temperature for the material from which the heat exchanger is constructed and without build up of carbon in the bed, injecting concentrated residual liquor fuel from said pulp mill to the bed thereby to burn said residual liquor in the bed, continuing to inject at least one of said fuels, coordinating the rate of fuel injection to operate the bed at operating temperature while simultaneously maintaining a rate of addition of coolant to the heat exchanger to insure the temperature of the metal of the heat exchanger does not exceed the yield temperature.

7 Claims, 1 Drawing Figure

FLUIDIZED BED START UP AND OPERATION

FIELD OF THE INVENTION

The present invention relates to fluidized bed burning of used liquors from a pulp mill. More particularly, the present invention relates to the use of waste material such as sawdust and the like as the start-up fuel for fluid bed chemical recovery systems in the Pulp and Paper Industry and/or for the generation of steam.

PRIOR ART

It is conventional in the Pulp and Paper Industry, when producing chemical pulp, to burn the used or residual liquor in a chemical and heat recovery furnace. The conventional kraft process recovers chemical by injecting black (residual) liquor from the pulping operation at about 65% solids concentration into the recovery furnace wherein the organic material in the liquor is burned in two stages. Concentrated liquor rapidly dries and forms a char bed above the hearth. This char bed burns as the first stage under reducing conditions at a temperature of 1300°–1700° F. and the recovered chemicals are drained from the char bed onto the hearth as a smelt and are discharged from the furnace. In the second stage, further oxygen is added at a higher location in the furnace to burn the gases evolving from the char bed. In the second stage a temperature of 2000°–2100° F. is attained and used to generate th steam. The steam generated in the furnace normally supplies the major portion of the steam requirements of the mill.

These smelting type recovery furnaces which are equipped with means for recovering heat generated by the burning of the residual liquor are subject to major safety problems as a result of serious explosions that have often been fatal. These explosions occur when water accidently contacts the smelt (sodium carbonate and sodium sulfide) at the bottom of the furnace. Although major efforts have been made to avoid such accidental contact, failure of a tube in the water cooled wall and/or in the boiler, for whatever reason, has resulted in serious explosions.

If the recovery is carried out by means of fluidized bed combustion, the recovered inorganic chemical is in the form of pellets and since the pellets are solid rather than molten, as in a smelting furnace, the explosion hazard referred to above is eliminated. However, the combustion must be carried out at a maximum temperature of less than about 1300° F. (with a kraft liquor) to prevent the pellets melting on the surface and agglomerating into a large mass which prevents fluidization of the bed. Heretofore, the bed has been maintained at this relatively low temperature by firing a relatively dilute liquor, thereby reducing the heat available to be recovered from the flue gas as steam. This dilute liquor will have a concentration in a range of about 30–40% solids as constrasted with the 65% solids used in the smelting furnace. For this reason, fluidized bed combustion has been largely limited to use with semi-chemical pulping liquors wherein the amount of organics in the residual liquor is relatively low and thus the total heat available for steam generation is relatively low.

Fluid bed technology is also being used for the combustion of coal. With coal, it is also desirable to limit and control the maximum temperature, but in this case this temperature can be about 1500° to 1800° F., somewhat higher than that possible with pulp liquors. When limestone chips are used as the fluidizing medium they calcine and react with sulfur dioxide formed, and by limiting the maximum temperature, formation of $NO_x$ is reduced and slagging of the ash is prevented. In contrast to the relatively low heat recovery efficiency obtained with controlled temperature fluid bed combustion of pulp liquors, satisfactory efficiency is possible with coal. In this latter case the temperature is limited and controlled by means of heat exchange tubes placed directly in the bed, and additional heat is recovered by means of a conventional boiler placed in the path of the hot flue gases leaving the bed. The calcium salts formed are removed with the ash and fresh calcium carbonate chips are added continuously with the coal thus maintaining the fluidized bed.

The hot moving elements in a fluidized bed result in excellent combustion at the controlled temperature after the system reaches temperature. However, prior to reaching temperature from a cold start they form a heat sink which can prevent combustion from taking place with a fuel dispersed throughout the bed. This problem is greatly augmented by the effect of the heat exchange tubes in the bed which must be cooled to protect them from heat damage at temperatures lower than that at which self-sustaining combustion of the coal can take place. Heat transfer rates through heat exchange tubes placed in a fluid bed are several times greater than those of similar tubes placed in a gas at the same temperature and this further aggravates the problem of bringing a unit "on stream".

One method which has been developed for dealing with this problem in the fluid bed combustion of coal is to segment the bed into separate compartments and to use one compartment, fitted with fewer heat extraction tubes than the rest, to act as the primary ignition section. Commencing from a cold start, the contents of the pilot compartment are fluidized with pre-heated combustion air and also by means of oil or gas flames directed directly onto the bed. When this compartment reaches an adequate temperature and self-sustaining combustion is obtained with coal, the additional compartments are heated sequentially by gradually interchanging hot bed material to them until the whole system can be operated under self sustaining conditions. Because the primary ignition compartment operates at a somewhat higher temperature than the other compartments, carbon-containing fly-ash originating in the other compartments is recycled to this unit to complete its combustion.

Start-up of chemical recovery fluid bed units has been relatively easy in the past because there are no heat exchange means in the bed. However, concentrated high heat for example from a gas or oil burner cannot be applied to the bed as this would cause fusion and agglomeration of the particles in the bed. In such chemical recovery units, start-up is obtained by utilizing hot air (1000° F.) to bring the bed up to a temperature wherein charcoal is injected and burned, thereby to further increase the temperature to about 1100° F. where a concentrated black liquor can be burnt to bring the unit to its operating temperature of about 1250° F. As this operating temperature is approached the charcoal feed is shut off and the concentration of the liquor fed to the unit is reduced to the 30–40% thereby to hold the bed temperature substantially constant at the operating temperature.

It will be apparent that establishing self-sustaining conditions with simultaneous heat extraction from a fluidized bed using pulp liquor, which has heretofore not been accomplished, involves special problems. The maximum temperature of the bed must not exceed about 1300° F. (for kraft liquors) and a direct oil or gas flame cannot be used because of the relatively low melting point of the pellets. Furthermore, the temperature of the heat exchanger for practical reasons should not exceed the yield temperature of the metal from which it is constructed and it is therefore imperative that heat be extracted to cool the heat exchanger which, in turn, draws heat from the bed during the period when it is necessary to simultaneously increase the temperature of the bed to the desired operating temperature.

I have found that these problems can be overcome by using comminuted wood waste as a fuel for preheating the bed to temperatures adequate to maintain self-sustaining combustion of the residual liquor. Unlike the concentrated heat from the flame produced from a gas or oil burner the sawdust or other wood waste distributes itself throughout the bed producing a multiplicity of very small flames resulting from the generated gases allowing heat transfer to the pellets without bringing these to a molten state which would destroy the bed. A greater amount of heat release from the auxiliary fuel is required during the start-up phase prior to the addition of the liquor in order to both heat up the pellets and to generate steam and therefore provision for handling and injecting of the wood must be on a very substantial scale, particularly when compared with the relatively minor amount of charcoal required to start the fluidized beds without in bed cooling as practiced in the prior art.

When wood is heated in the presence of air its combustion takes place in two distinct stages. For instance with maple an initial exotherm (i.e. heat release) occurs at 580° F. this resulting from the release and combustion of combustible gases from the carbohydrate constituents while a second exotherm occurs at 797° F., this resulting from combustion of the residual lignin remaining in the charred wood. Thus wood should not be added until the temperature approaches the second exotherm, i.e. at a temperature approaching 800° F. If during the heating phase, it is added at an appreciable lower temperature than that of the second exotherm only a portion of the heat will be released. Under these circumstances incompletely combusted wood may accumulate in the bed which can cause a sudden excessive heat release when the second exotherm temperature is reached, this resulting in partial melting with subsequent adherence of the pellets.

Careful control of addition of the wood waste is important, particularly at the lower temperature range, in order to keep in step the combustion of the generated gases and char.

BRIEF DESCRIPTION OF THE PRESENT INVENTION

It is the object of the present invention to provide a process for start-up and operation of a fluidized bed chemical recovery system for use in a pulp mill wherein the fluidized bed incorporates a heat exchange surface within the bed to improve thermo-efficiency in the system.

Broadly, the present invention relates to a method of starting-up and operating a fluidized bed combustion unit for generating steam and recovering of inorganic chemicals from residual liquor of a pulp mill, said fluidized bed containing heat exchange equipment therein, comprising, forming a fluidized bed of pellets formed from said inorganic chemical by injecting air through the bottom of said bed, preheating said air to initially raise the temperature of the bed to a temperature at which a particulate ligno-cellulosic fuel will be substantially completely burned, injecting said particulate ligno-cellulosic material fuel into said bed so as to burn said fuel in suspension in said bed, feeding a cooling fluid through said heat exchange equipment in said bed to protect said heat exchange equipment from thermally induced damage, coordinating the rate of cooling of said heat exchange equipment with the rate of addition of said ligno-cellulosic fuel to further increase the temperature of the bed to at least a temperature at which concentrated residual liquor from said pulp mill may be burned while maintaining the temperature of the heat exchanger below the yield temperature for the material from which the heat exchanger is constructed and without the build-up of significant carbon in the bed, injecting concentrated residual liquor from said pulp mill and burning said liquor in said bed to maintain said bed at an operating temperature while continuing to introduce cooling fluid so that the temperature of said heat exchange equipment does not exceed said yield temperature.

The ligno-cellulosic fuels such as woodwaste contain essentially the same organic fuel material as the black liquor and may be used in place of the black liquor both to raise the temperature of the bed to operating temperature and to generate the steam requirements of the mill when the black liquor fuel supply is not available. Operating with auxillary fuel only, or as a significant portion of the fuel, requires facilities to maintain the bed by controlled addition of pellets from a reserve supply.

BRIEF DESCRIPTION OF THE DRAWINGS

Further features, objects and advantages will be evident from the following detailed description of the preferred embodiments of the present invention taken in conjunction with the accompanying drawings, in which.

DESCRIPTION OF THE PREFERRED EMBODIMENTS

Figure 1:
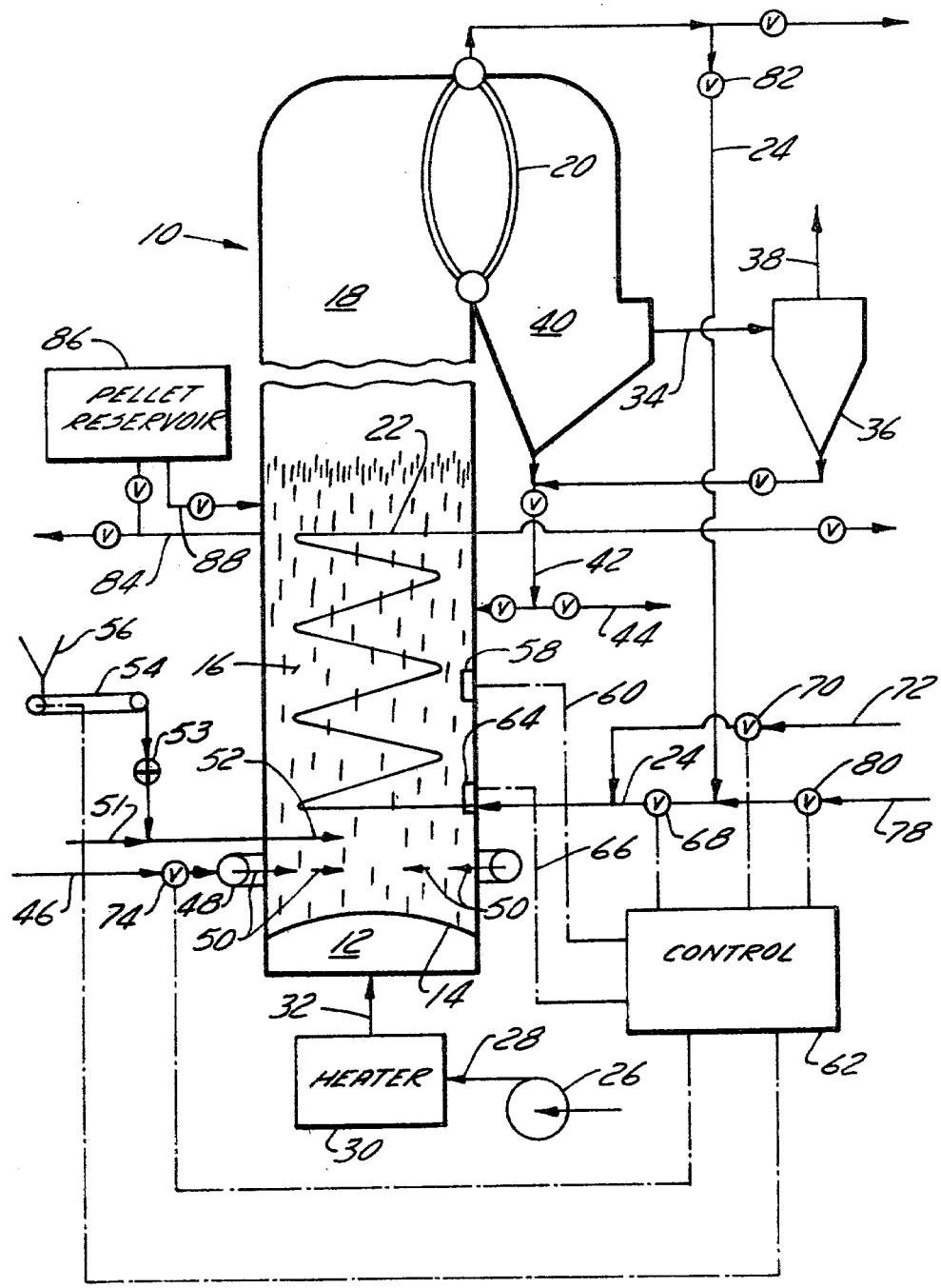
FIG. 1 is a schematic cross-section of a fluidized bed black liquor recovery system incorporating the present invention.

As illustrated, the fluidized bed recovery unit 10 has a bottom plenum 12, a perforated (disperser) plate 14 forming the top of the plenum, an upper section containing the fluidized bed 16 of pellets formed from the inorganics in the residual liquor being recovered and a free board area 18. A boiler generally indicated at 20 is provided in the path of the exhaust gases and similarly the fluidized bed 16 has imbeded therein a heat exchanger 22. Alternatively or in addition water tubes may line the walls of the unit 10 to provide water wall cooling or heat exchange surface.

The heat exchanger 22 may function as a boiler or part of a boiler but preferably will be operated as a super-heater with steam generated in the boiler 20 passing via line 24 to the heat exchanger 22 or from another source 78 during start up.

A suitable blower such as that indicated at 26 blows air via line 28 through heater 30 and from heater 30 via line 32 into the plenum 12 and through the plate 14 to fluidized bed 16.

Gases from the fluidized bed unit 10 after being cooled by boiler 20 pass via line 34 to a suitable cyclone 36 to separate the particles carried in the gas stream from the stream. These flue gases leave the cyclone 36 via line 38 and may then pass to a suitable scrubbing system and stack, etc. (not shown). Fines separated from the fluid gases in the unit 10 after the boiler 16 i.e. in the section 40 or in the cyclone 36 may be returned to the bed 16 via line 42 and injected into the bed via a suitable mechanism (not shown). Any excess fines may be bled from the system via line 44.

Residual liquor from the pulp mill enters the system via line 46, is distributed around the bed by the bustle manifold 48 and is injected into the bed 16 at several locations around the bed via nozzles 50. Alternatively the liquor may be sprayed onto the surface of the bed 16. This residual liquor may be at a concentration significantly higher than the 30-40% concentration normally used in fluidized bed whereby burning of the residual liquor generates significantly more heat than that required to maintain operating temperature. Preferably, the concentration of the residual liquor will be at about 65% solids, however, with suitable equipment for drying the liquor and injecting it dry into the bed dried residual liquor may alternatively be injected and burned. The heat exchanger 22 absorbs heat that heretofore has been wasted in evaporating water accompanying the dilute liquor and/or extra water sprayed on the bed to control the bed temperature, and produces usable steam. The heat exchanger 22 also may be used in regulating the temperature of the bed and to insure that this temperature does not deviate significantly from the operating temperature for the particular inorganic chemicals forming pellets in the bed as will be described hereinbelow. Control of bed is governed to insure the temperature of the heat exchange equipment does not exceed yield temperature of the metal which under certain conditions may limit the effectiveness of this equipment to control bed temperature.

The ligno-cellulosic particulate solid fuel such as sawdust is injected directly to the bed 16 preferably by an air injector or injectors 52 supplied with air from line 51 and fed with auxiliary fuel through star valve 53 from weigh belt 54 and hopper 56. The injector or injectors 52 inject the solid ligno-cellulosic fuel (woodwaste) into the bed below the upper surface thereof preferable adjacent the perforated plate 14. The particle size of the fuel will be such that it is not entrained and carried out of the bed before at least a significant portion thereof is substantially completely burnt. Any burning above the bed does little to increase the temperature of the bed and should be avoided.

To best ensure maximum burning of the woodwaste or auxiliary fuel in the bed, this material should be injected near the bottom of the bed and the size of the fuel be compatible with the size and density of the packing of the pellets in the bed and the gas velocity through the bed. Sawdust or chipper fines are suitable for this purpose. As above indicated, it is important that this woodwaste material or auxiliary fuel not be simply entrained above the bed and burnt in the free-board space.

Not just any auxiliary fuel may be used with the present invention either for generating steam when the unit is at operating temperature or particularly during start-up. It is important that any ash content of the fuel not contaminate the pellets as these pellets will form the make-up chemical for the pulp mill and thus many fuels such as powdered coal or the like probably would not be suitable. The ligno-cellulosic material such as woodwaste etc. is particularly suitable for use as the auxiliary fuel since unlike oil or gas it distributes itself throughout the bed. I have found that it will burn within the bed at a temperature of 800° F. or higher without appreciable free-board burning. The amount of such fuel necessary when heat exchange means are incorporated in the bed is very significant and thus an adequate supply is essential. Furthermore, if the material is to be used simply for generation of steam, it must be as inexpensive a fuel as possible.

When heat is extracted from the flue gas as in a normal residual liquor recovery boiler operation, it is possible to maintain satisfactory operating temperatures throughout the furnace over a considerable range of production rates by adjusting the air supply to correspond to the rate of residual liquor production, if necessary adding oil or gas as an auxilliary fuel. With fluid beds having heat exchange means in the bed operation and temperature control is considerably more difficult at lower residual liquor rates.

The heat extraction tubes provide a major heat sink which will immediately and rapidly result in a serious temperature drop when the liquor rate is reduced unless appropriate compensating action is taken. I have found that various strategies can be used, singly or in combination. As already stated, the temperature can be maintained by adding woodwaste as an auxilliary fuel, and in this way maintain steam production. Although the heat exchange surface provided for the bed is fixed, some variable controlled degree of heat removal can be obtained by varying the height of the bed, and this is particularly desirable during the initial heating-up stage. The amount of heat extracted from a heat exchange surface of given size can be varied to some extent by various methods depending on whether the heat exchanger is functioning as a boiler or superheater. If the exchanger is operated as a boiler, the pressure or circulation rate may be varied to provide a limited degree of control. Preferably, the heat exchanger will be a superheater and control may be exercised by throttling the flow of steam through exchanger e.g. by varying the amount of steam passing through the exchanger and by-passing the excess or by injecting water into the steam entering the exchanger to vary the temperature of the incoming steam or a combination of these methods. As is well known, care must be taken to ensure that too much water or too large water droplets do not enter the system and cause damage. With superheated steam the control may act much in the manner of an attemperator and, in fact, after bed temperature is stable the heat exchanger may be used as a part of an attemperator to control the characteristics of the steam produced.

It will be apparent that one must be able to control the bed temperature both during start-up and operation, and suitable controls must be provided. A temperature senser 58 senses the temperature in the bed 16 and feeds this information via line 60 to a central control 62 which preferably will be a computer control. Obviously the control system will be different depending on whether the heat exchanger 22 in the bed is operated as a boiler or as a superheater.

If the heat exchanger 22 is operated as a boiler, obviously there will be no steam entering the system from lines 78 and 24. Feed water will simply enter via line 72 under the control of valve 70 (regulated by the controller 62). This feed water 72 may originate from any suitable source and under these circumstances control is primarily obtained by adjustment of the valve 70 to change the rate of flow of feed water through the system assuming a pump through system. Alternatively, the pressure in the heat exchanger 22 may be varied thereby to change the temperature and adjust to a limited degree the heat transfer to the heat exchanger.

When the heat exchanger 22 is operated as a superheater a variety of different controls are available and more control may be exercised. In this case, the temperature of the heat exchanger 22 should also be sensed via sensor 64 and this information fed to the control 62 via line 66. The controller 62 will then regulate the feed of coolant to the heat exchanger 22 via valve 68 which can control both steam from the boiler 20 entering via line 24 and/or steam (saturated or superheated) from line 78 when auxillary steam is used. Obviously, when the auxillary steam is used the valve 80 must be opened. The control valve 68 controls the rate of flow of steam through the heat exchanger and thereby the heat absorbed by the heat exchanger which will in turn govern the temperature of both the bed and of the heat exchanger itself. Water may be added to the steam injected to the heat exchanger 22 (assuming that the steam entering the heat exchanger is superheated so that no large droplets of water could contact and cause thermoshock to the equipment). Under these conditions valve 70 in the water line 72 could be regulated by the control 62 to control bed temperature. Water from line 72 desuperheats the steam in the line leading into the heat exchanger 22 to control the temperature of the steam entering the heat exchanger and thereby controlling the amount of heat absorbed by the heat exchanger.

The controller 62 may also control valve 74 in residual liquor line 46 to adjust the amount of residual liquor that is fed to the fluid bed. This is particularly important during start-up but during operation at operating temperature the rate of residual liquor fuel addition is normally regulated by the output of the pulp mill. The controller 62 also controls the weigh belt 54 to adjust feed of auxillary fuel to the fluid bed.

It is a well known requirement that heat exchangers should not be subjected to any type of thermoshock nor should their temperature ever exceed the yield temperature of the material from which they are made, as either of these may result in thermally enduced damage to the equipment. Shock damage may occur for example if water in sufficiently large quantities or droplets is injected into the hot tubes and flashes suddenly to damage the tubes. Permitting the temperature of the heat exchanger to exceed the yield temperature also may damage the equipment. By yield temperature it is intended the temperature at which the metal or material from which the heat exchanger is made, under the stress conditions in the exchanger, results in a permanent set or permanent damage i.e. this may be caused by a phase change in the metal or the metal may distort to a point where it cannot recover after it is cooled. This yield temperature for mild steel pressured tubes is generally considered to be about 850° F.

The start-up procedure will vary depending on whether the heat exchanger is functioning as a boiler or as a superheater but in either case in the initial start-up, heat is applied to the bed substantially only by preheating the fluidizing air. During this initial stage it is preferred to add only a portion of the pellets to the bed to limit the height of the expanded bed so that it may be easily and quickly raised to combustion temperature for burning of the auxillary fuel (about 800° F.) and then to increase the bed height by adding further pellets. These added pellets are heated primarily by combustion of the auxillary fuel in the bed rather than the preheated air. Minimizing of the height of the bed until the auxillary fuel is burned is particularly important if the heat exchanger is used as a boiler since coolant must be passed through the in-bed heat exchanger during the initial stage as thermal shock will occur if water is initially injected when the temperature of the heat exchanger is too high, even if the yield temperature has not been exceeded. Under these circumstances it may be desirable to position the bottom of the heat exchanger well above the defuser plate 14 in the fluid bed so that initially contact between the bed and the heat exchanger and thereby extraction of the heat from the bed is minimized.

The start-up with heat exchanger 22 as a boiler i.e. containing water requires coolant be fed to the heat exchanger at the beginning of the start-up period. Very little control is available based on the flow of heat exchanger medium through the heat exchanger, thus the heat exchanger if substantially submerged in the bed will extract a significant amount of heat which must be supplied by preheating the air. Start-up begins by feeding hot air through the fluid bed to fluidize same while preferably maintaining the height of the fluidized bed low so that little, if any, of the heat exchanger is contained within the bed thereby to raise the temperature up to the temperature at which the ligno-cellulosic fuel will burn. This fuel is injected and burned to raise the temperature of the bed while raising the bed height by the addition of further pellets to raise the bed around the heat exchange means and expand it to its desired height. The temperature is raised until the temperature for combustion of concentrated residual liquor is reached and at this point the residual liquor is injected into the bed and burned together with the auxillary fuel to raise the bed to operating temperature. At operating temperature, the temperature control of the bed will primarily be by rate of circulation of water through the boiler or by varying the pressure on the boiler or by adjustment of rate of fuel fed to the system or by adjusting to a limited degree the amount of preheat to the air or a combination of these controls. It must be remembered that under normal operation all the liquor from the pulp mill is to be burned for recovery and thus only the auxillary fuel may normally be adjusted for control.

When the heat exchanger 22 functions as a superheater, control is much more flexible. Under these conditions the bed is heated by the addition of hot gas, again preferably with a small bed thereby to minimize the heat required to raise the temperature of the pellets in the bed when preheated air is the sole source of heat. After auxillary fuel is being fired, the bed level is increased by the addition of further pellets and the flow of coolant through the heat exchanger is begun. The firing of auxillary fuel and the flow of coolant are started at about the same temperature (the minimum temperature for the addition of wood waste solid fuel is about 800° F. and the yield temperature for the heat exchanger will normally be about 850° F.). The rate of flow of steam through the heat exchanger can be adjusted so that a minimal amount of heat is extracted initially by adjusting the valve 68 which normally will reduce the amount of steam passing through the exchanger to a minimum commensurate with insuring the exchanger does not exceed the yield temperature. In some cases this might also require adjusting the valve 70 to desuperheat the steam entering the exchanger or combination of adjustments of valves 68 and 70. Such control permits a minimum amount of heat to be extracted from the bed while ensuring that the temperature of the heat exchanger does not exceed the yield temperature for the material from which it is fabricated.

After the temperature of the bed has reached the ignition temperature for concentrated residual liquor from the pulp mill the residual liquor is then fed as the fuel to the bed either as the sole fuel or in combination with the auxiliary solid fuel and the temperature of the bed again raised until the operating temperature is reached. As the bed approaches operating temperature the amount of heat extracted is gradually increased as the fuel rate is increased. When the bed is at operating temperature the residual liquor feed rate will be in accordance with mill requirements and the amount of heat extracted will be coordinated to maintain the bed at operating temperature. If extra steam is required over that available from burning of the residual liquor ligno cellulosic auxiliary fuel may be fired together with the residual liquor and the bed temperature maintained at the required operating temperature by controlling the heat extracted.

As above described the temperature of the bed is continually increased at a rate controlled by the controller 62 until the temperature at which the concentrated residual liquor will be burned in the bed is reached. Then residual liquor in line 46 begins to be fed to the fluid bed 16 by adjustment of the valve 74 by control 62. The rate of addition of residual liquor is controlled in conjunction with the rate of feed of auxiliary fuel from hopper 56 to gradually increase the bed temperature until it reaches the operating temperature for the bed. Obviously, the addition of coolant to the heat exchanger 22 is continually controlled to ensure that the said yield temperature is never exceeded. (If the heat exchanger 22 is used as a boiler the temperature of the heat exchanger should never exceed the yield temperature and little control need be exercised.) As the feed of residual liquor increases it may be desired to cut-off or reduce the feed of auxiliary fuel, thus the speed of the belt 54 may be gradually reduced via the controller 62 as the valve 74 is opened. In this manner, the feed of the auxiliary fuel may be completely phased out assuming an adequate supply of residual liquor is available.

During operation of the unit, after operating temperature (1200°-1300° F. with a kraft liquor) is reached and a stable operation is being attained, control of the bed temperature may be obtained via control of flow through the exchanger via valve 68, control of the water injected via line 72 (assuming steam flow through the exchanger 22), control of the auxiliary fuel injected via injector 52 and/or control of the residual liquor fuel injected via line 46 however as above indicated under normal operation of the mill the feed of residual liquor will be set by the mill. With properly designed heat exchange means bed temperature may also be regulated to a degree by changing the amount of heat exchange surface exposed in the bed (by changing bed height or moving the heat exchanger). The concentration of the fuel being fed also affects bed temperature. It must be emphasized that the controlling element in the mill is the production of pulp and the recovering of chemical and that under normal operating conditions the amount of residual liquor fired will be adjusted to match the production of the mill. When the fuel feed rate is at a minimum the controller 62 may have to operate to ensure that the temperature of the heat exchanger 22 never exceeds the upper limitation defined by the yield temperature for the equipment (about 850° F. for mild steel). However, as long as the temperature of the heat exchanger equipment 22 remains below the said yield temperature the controller 62 may manipulate other means described above and adjust the amount of heat extracted from the bed to control bed temperature.

If desired, the injection of ligno-cellulosic fuel may be maintained after the fluidized bed has reached operating temperature (1200°-1300° F. for kraft liquors) and the fluidized bed can be fueled by both residual liquor from the recovery process and the auxiliary fuel. This arrangement will provide more independence of steam generation on pulp production or change in liquor flow rate to the recovery unit. For example, if the pulp mill is shut down or if the pulp mill is operating at reduced capacity, the steam generating capabilities of the fluid bed may be maintained by injecting more auxiliary fuel such as wastewood material.

Obviously, during normal production of the unit 10 the pellets generated in the bed 12 from the residual liquor are bled therefrom via a suitable line as indicated at 84. These pellets are then used in any suitable manner, preferably to recover chemical for the pulping operation and in the case of a kraft system would be fed to a separate reduction unit. A reservoir of pellets 86 is maintained adjacent the unit 10 for operation of the unit 10 for limited periods of time using substantially only the auxiliary fuel. As is well known, to maintain fluidity of the bed, the particle size distribution of the pellets or the particles in the bed must be maintained and if no further new particles are being generated as are generated during recovery operations (when burning residual liquor in the bed) it may be necessary to restrict the return of fines and inject further pellets from the reservoir 86 via line 88 into the bed. It is important that the flexibility for control of particle size in the bed be maintained so that one may control the amount of fines returned to the bed via line 42 and the amount of pellets returned from reservoir 86 via line 88 in order to maintain the proper particle size distribution and fluidity of the bed. The particle size distribution to maintain fluidity will vary from unit to unit, however, an experienced operator should, with little difficulty, be able to maintain the proper size distribution to maintain the fluidity.

While the disclosure has dealt with the use of the heat exchanger 22 as either a boiler or a superheater obviously both a superheater and a boiler may be incorporated in the bed.

Modifications may be made without departing from the spirit of the invention as defined in the appended claims.

I claim:

1. A method of starting-up and operating a fluidized bed recovery unit for generating steam and recovering waste chemicals from residual liquor produced in a pulp mill, said bed containing indirect heat exchange means said method comprising; blowing air upward through said bed so as to fluidize said bed, said bed being comprised of pellets formed from inorganic materials from said residual liquor, preheating said air to initially raise the temperature of said bed to a first temperature above a temperature at which a particulate ligno-cellulose solid fuel compatible with said pellets will substantially be burned completely and below the yield temperature of the material from which said heat exchange means is constructed, injecting said ligno-cellulosic solid fuel into said bed so as to burn said solid fuel in suspension in said bed, feeding a coolant fluid through said heat exchange means to protect said heat exchange means from thermally induced damage, coordinating the rate of feeding of said coolant through said heat exchange means with the rate of injection of said solid fuel to further increase the temperature of said bed to at least a second temperature at which concentrated residual liquor from said pulp mill may be burned without the build-up of carbon in said bed but below a temperature at which said pellets will aglomerate while maintaining the temperature of the heat exchange means below the said yield temperature injecting said residual liquor in concentrated form as a further fuel into said bed so as to burn organic material in said residual liquor, continuing to inject at least one of said fuels and controlling the rate of fuel injection to operate said bed at a bed operating temperature while simultaneously maintaining a rate of addition of coolant to said heat exchange means to ensure that the temperature of said heat exchange means does not exceed said yield temperature.

2. A method as defined in claim 1 wherein the height of said bed is maintained at a minimum until ligno-cellulosic solid fuel is injected into the bed and thereafter further pellets are added in order to increase the bed height.

3. A method as defined in claim 1 wherein said ligno-cellulosic fuel is one or more of the group comprising sawdust, shavings and bark.

4. A method as defined in claims 1, 2, or 3 wherein said solid fuel is replaced by residual liquor as said operating temperature is approached.

5. A method as defined in claims 1, 2 or 3 wherein the heat exchange fluid comprises steam and wherein said addition of solid fuel is maintained when said operating temperature is reached, thereby to increase the steam produced by said heat exchange means over what is available from the residual liquor.

6. A method as defined in claims 1, 2 or 3 wherein said heat exchange fluid comprises steam and wherein said method further comprises controlling said bed temperature at said operating temperature by sensing the temperature of said bed, adding water to steam being fed through said heat exchange means and controlling the amount of water added to said steam to maintain the temperature of said bed substantially constant at said operating temperature.

7. A method as defined in claims 1, 2 or 3 wherein the heat exchange fluid comprises steam and said method further comprising; maintaining the amount of steam generated in said heat exchange means substantially constant when said bed is at said operating temperature, sensing the temperature of said bed, regulating the amounts of said fuels fed to said bed thereby to maintain said operating temperature substantially constant.

* * * * *